United States Patent
Erdman et al.

(10) Patent No.: US 7,500,790 B2
(45) Date of Patent: Mar. 10, 2009

(54) CONNECTOR ASSEMBLY CLIP

(75) Inventors: David Donald Erdman, Hummelstown, PA (US); Michael Lawrence Gurreri, York, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 10/546,933

(22) PCT Filed: Mar. 8, 2004

(86) PCT No.: PCT/US2004/006965

§ 371 (c)(1),
(2), (4) Date: Aug. 25, 2005

(87) PCT Pub. No.: WO2004/081614

PCT Pub. Date: Sep. 23, 2004

(65) Prior Publication Data

US 2006/0159399 A1     Jul. 20, 2006

Related U.S. Application Data

(60) Provisional application No. 60/452,868, filed on Mar. 6, 2003.

(51) Int. Cl.
*G02B 6/36* (2006.01)
(52) U.S. Cl. .............................. 385/75; 385/65; 385/69; 385/83; 385/86
(58) Field of Classification Search ................... 385/65, 385/69, 75, 83, 86
See application file for complete search history.

(56) References Cited

U.S. PATENT DOCUMENTS

| 5,123,071 | A | | 6/1992 | Mulholland et al. |
| 5,268,982 | A | | 12/1993 | Schaffer et al. |
| 5,343,547 | A | | 8/1994 | Palecek et al. |
| 5,398,295 | A | | 3/1995 | Chang et al. |
| 5,475,781 | A | | 12/1995 | Chang et al. |
| 5,579,425 | A | | 11/1996 | Lampert et al. |
| 5,675,682 | A | | 10/1997 | De Marchi |
| 6,024,498 | A | | 2/2000 | Carlisle et al. |
| 6,212,324 | B1 | * | 4/2001 | Lin et al. ..................... 385/136 |
| 6,256,448 | B1 | * | 7/2001 | Shahid ........................ 385/147 |
| 6,287,018 | B1 | * | 9/2001 | Andrews et al. .............. 385/60 |
| 6,409,392 | B1 | | 6/2002 | Lampert et al. |
| D481,680 | S | * | 11/2003 | Cheng et al. ............... D13/133 |

* cited by examiner

*Primary Examiner*—Jerry T Rahll

(57) ABSTRACT

An optical connector assembly comprising (a) a plurality of identical connectors, each connector being connected to a jacketed optical cable, each connector comprising a generally rectangular housing having a top, a bottom and two sides, and having a plug end for insertion into a mating receptacle and a cable end for receiving an optical cable, the housing having a recess along each of the two sides; and (b) a clip holding the plurality of connectors together in a side-by-side relationship, the clip having a bottom portion, first and second end walls extending perpendicularly from the bottom portion, and one or more intermediate portions extending perpendicularly from the bottom portion between the first and second end walls, each of the one or more intermediate portions having a first face facing the first end wall and a second face facing the second end wall, wherein the first end wall and a first face of one of the one or more intermediate portions are received in the recess of one of the connectors and the second end wall and a second face of one of the one or more intermediate walls are received in the recess of another of the connectors such that the connectors are held in a side-by-side arrangement.

23 Claims, 4 Drawing Sheets

CONNECTOR ASSEMBLY CLIP

REFERENCE TO RELATED APPLICATION

This application claims priority to U.S. Provisional Application No. 60/452,868 which was filed on Mar. 6, 2003 and is hereby incorporated by reference.

FIELD OF INVENTION

The present invention relates generally to optical fiber connectors, and, more specifically, to duplex connector assemblies.

BACKGROUND OF INVENTION

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating (herein "mating device"). This way, the light from one fiber is optically coupled to the optical path of the mating device.

A typical connector comprises a housing containing a ferrule which holds one or more fibers. The ferrule is biased forward in the housing such that, when the connector is mated to the mating device, the fiber in the ferrule urges against the optical path of the mating device. There are many different prior art connectors currently available for establishing such optical connections, including, for example, SC, ST and FC connectors and more-recent "small form factor" designs such as MTRJ, MU, LC, MPX and MPO-type connectors.

In networks and communication equipment that utilize optical fibers, often optical fibers are mated in pairs corresponding to a transmitting optical fiber and a receiving optical fiber. It is essential that the connections be made correctly. For example, it is important to ensure that a transmitting optical fiber is connected to another transmitting fiber or to a transmitter port of a transceiver and that a receiving optical fiber is connected to another receiving optical fiber or to a receiver port of a transceiver.

To ensure proper polarity, duplex optical connectors have been used in the communications industry to couple two simplex optical fibers together in a duplex arrangement to allow both optical fibers to be connected simultaneously to ports located on communication equipment or to an adapter which connects pairs of optical fibers together. For example, U.S. Pat. No. 5,579,425 (hereinafter the '425 patent) discloses an optical fiber duplex connector based on the LC connector, which is shown in FIG. 3. The duplex connector is formed by joining together a pair of simplex LC connectors 51 with a plastic clip 52. Each clip 52 includes a first planar structure 53 having a pair of cylindrical pins 54 of different diameters thereon. The cylindrical pins 54 are press fit into associated openings 55 formed in the simplex connectors 1, thereby connecting them together. The plastic clip 52 has information thereon, such as the letters A and B, which identifies the correct polarization of the duplex connector with respect to its mating device (e.g., an adapter). Although the plastic clip design of the '425 patent provides a novel way for forming a duplex connector, it has been found that the cylindrical pins tend to have marginal holding strength and are generally not as robust as desired. Furthermore, since the clip is intended to augment the connector's latch mechanism—i.e., it provides the user with a larger area to actuate the latch—the connector is somewhat dependent on the clip. This dependence undermines the use of the connectors in simplex applications. In other words, by designing a connector to work in conjunction with the clip, the connector does not function as well independently, perhaps necessitating different connectors for simplex applications.

FIG. 4 illustrates another known optical fiber duplex connector. The duplex connector shown in FIG. 3 comprises two connectors 60 clipped together by a duplex yoke 61, which attaches near the back ends of the connector housings. Once the duplex yoke 61 has been attached, end portions of two strain relief boots 62 are pushed over crimp cans 63 extending from the back ends of the connector housings. Heat fit tubing 64 is attached to the fiber cable 65 and to the ends of the crimp cans 63. Each of the connectors 60 comprises a two-piece housing. The front portion 16 of the housing has a latch 67 thereon and houses the ferrule assembly (not shown) that holds the end of the optical fiber. The back portion 68 of the housing contains a metal insert (not shown) that assists the connector in handling side loading. The optical fiber cable 65 contains aramid fiber strength members that are crimped to the metal insert. As with the duplex connector of the '425 patent, the duplex yoke 61 attaches to the connector housings. The housings of the connectors 60 must be sufficiently long to enable the yoke 11 to be attached to them because the connectors 60 require the back portions 68 of the housings. As with the duplex connector of the '425 patent, the duplex connector shown in FIG. 4 is used normally on the front side of receptacles/adapters, rather than on the back side. Although this connector assembly is suitable for its intended purpose, the fact that the anti-snag guard/latch actuation pad is integral with the duplex clip militates in favor of using the connector with a duplex clip—even to a greater extent than with the connector of the '425 patent. The preference to use different connectors for simplex and duplex applications tends to increase the number of components of the connector system, thereby increasing inventory costs and, in general, adding complexity to the system.

In U.S. Pat. No. 6,409,392, a duplex clip is disclosed for coupling two simplex connectors of the type used in behind-the-wall (BTW) applications to form a duplex connector. Connectors suitable for BTW applications are typically considerably shorter in length than the two-piece connectors 50 and 60 shown in FIGS. 3 and 4, respectively. As disclosed in the '392 patent, the duplex clip comprises a clip body that is adapted to receive and grip outer surfaces of the boots of the pair of simplex connectors to hold the simplex connectors in close spatial proximity to one another, thereby forming a duplex connector. Two generally cylindrical bores are formed in the clip body and the inner surfaces of each of the bores are adapted to grip the outer surfaces of the boots. Slots are formed in the clip body to provide the bores with generally C-shaped cross-sections. Cables can be passed through the slots to enable the clip to be clipped onto a pair of simplex connectors when the simplex connectors are coupled to or decoupled from a receptacle or adapter.

Although the duplex clip configuration of the '392 patent provides for a connector which can be used in BTW applications, the applicants have identified a number of shortcomings with this configuration. First, the duplex clip of the '392 patent's requires the use of a boot on the end of the connector. Although boots are common, they are not necessary for all applications. The duplex clip of the '392 patent would be unsuitable for applications in which the boot was not used. Furthermore, the yoke configuration of the duplex clip disclosed in the '392 patent is relatively bulky and extends well beyond the periphery of the housing of the connector. This can be problematic in certain applications where there is a need to minimize the space occupied by the connector.

Therefore, there is a need for a connector system which provides for a duplex connector assembly in which the connectors used for simplex and duplex connectors are identical, and in which the clip used to form the assembly is simple and unobtrusive while nevertheless providing for a robust interconnection system that does not require the use of additional components (e.g., a boot). The present invention fulfills this need among others.

SUMMARY OF THE INVENTION

The present invention provides for a connector system which facilitates the assembly of two or more identical connectors using a simple and robust clip. Specifically, the system employs a simple, but effective, clip which engages a contoured section of the housings of standard simplex connectors to hold two or more of them securely in place.

The connector system of the present invention offers a number of significant advantages over prior art connector systems. First, it uses identical simplex connectors as building blocks for larger, more-complex connector assemblies (e.g., duplex and quad connector assemblies). Thus, there is no need to stock and maintain an inventory of connectors intended specifically for either simplex or duplex connector assemblies. Second, since the clip engages each connector around its periphery, the clip and connecter are mechanically interengaged, thereby improving the structural integrity and reliability of the connector assembly. For example, by way of contrast, the assembly does not rely on a friction fit between pegs and holes of the connectors and clip. Such a robust connector assembly system is very desirable in applications where external aggression on the connector is common. Third, the clip of the present invention is very discrete, having a profile that does not extend much beyond the periphery of the housing, if at all. In a preferred embodiment, the clip is received in a recess of the connector, further minimizing its profile in the connector assembly. Fourth, the clip of the present invention cooperates with simplex connectors without the need for additional components such as boots or other cable dress. This further increases its simplicity and ease-of-use. Finally, the clip can be installed before or after the connectors are terminated—it is totally independent of the fiber cable connected to the connector. This allows duplex and other assemblies to be formed in the field.

One aspect of the invention is an optical connector assembly comprising the clip. In a preferred embodiment, the connector assembly comprises (a) a plurality of identical connectors, each connector being connected to a jacketed optical cable, each connector comprising a generally rectangular housing having a top, a bottom and two sides, and having a plug end for insertion into a mating receptacle and a cable end for receiving an optical cable, the housing having a recess along each of the two sides; and (b) a clip holding the plurality of connectors together in a side-by-side relationship, the clip having a bottom portion, first and second end walls extending perpendicularly from the bottom portion, and one or more intermediate portions extending perpendicularly from the bottom portion between the first and second end walls, each of the one or more intermediate portions having a first face facing the first end wall and a second face facing the second end wall, wherein the first end wall and a first face of one of the one or more intermediate walls are received in the recess of one of the connectors and the second end wall and a second face of one of the one or more intermediate walls are received in the recess of another of the connectors such that the connectors are held in a side-by-side arrangement.

Another aspect of the invention is the clip for facilitating the connector assembly described above.

Other aspects, advantages, and novel features of the invention will become more apparent from the following detailed description when taken in conjunction with the accompanying drawings.

BRIEF DESCRIPTION OF DRAWINGS

The invention and its mode of operation will be more clearly understood from the following detailed description when read with the appended drawings in which.

DETAILED DESCRIPTION OF INVENTION

Figure 1:
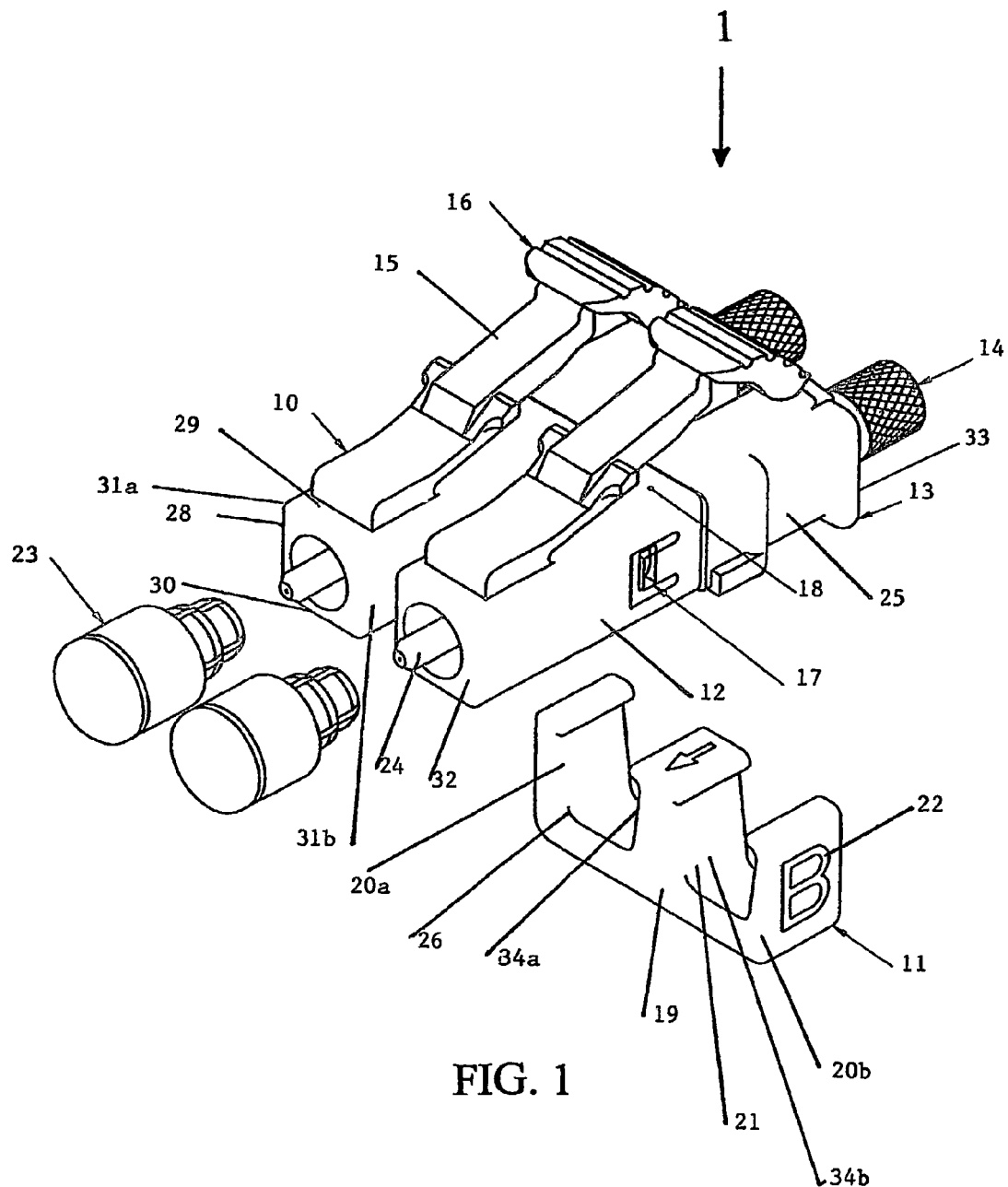
FIG. 1 is an exploded view of a preferred embodiment of the present invention using a polymeric clip.

Referring to FIG. 1, a preferred embodiment of the connector system of the present invention is shown. The connector assembly 1 comprises a plurality of identical simplex connectors 10. Each connector comprises a generally rectangular housing 28 having a top 29, a bottom 30, sides 31a, 31b and two ends-a front or plug end 32 and a back or cable end 33. The plug end 32 is suitable for insertion into a mating receptacle (not shown) while the cable end 33 is adapted for receiving and securing an optical cable (not shown). The housing 28 has a recess 25 along each of the two sides 31a, 31b. The connector assembly also comprises a clip 11 for holding the plurality of connectors 10 together in a side-by-side relationship. The clip has a bottom portion 19, first and second end walls 20a, 20b extending substantially perpendicularly from the bottom portion 19, and one or more intermediate portions 21 also extending substantially perpendicularly from the bottom portion 19 between the first and second end walls 20a, 20b. Each of the one or more intermediate portions 21 has a first face 34a facing the first end wall 20a and a second face 34b facing the second end wall 20b. The clip 11 and connectors 10 cooperate such that, when the clip 11 is engaged with the connectors 10, the first end wall 20a and a first face 34a of one of the one or more intermediate portions 21 are received in the recess 25 of one of the connectors 10 and the second end wall 20b and a second face 34b of one of the one or more intermediate walls 21 are received in the recess 25 of another of the connectors 10 such that the connectors 10 are held in a side-by-side arrangement. The connectors and the clip of the connector assembly of the present invention are discussed in greater detail below.

The connector depicted in FIG. 1 conforms to the LC-type connector standard, accordingly the details of this connector which are common with those of a standard LC-type connector will not be discussed in detail herein. It should be understood, however, that the present invention is not restricted to an LC-type connector or any other connector type for that matter, and can be used with a variety of connector systems, including, for example, the MU, ST, FC, SC, MPX, and MPO connector systems. Although the present invention may be practiced with any connector system, it is particularly well suited for small form factor single fiber connectors such as the LC and MU-type connectors.

Figure 2:
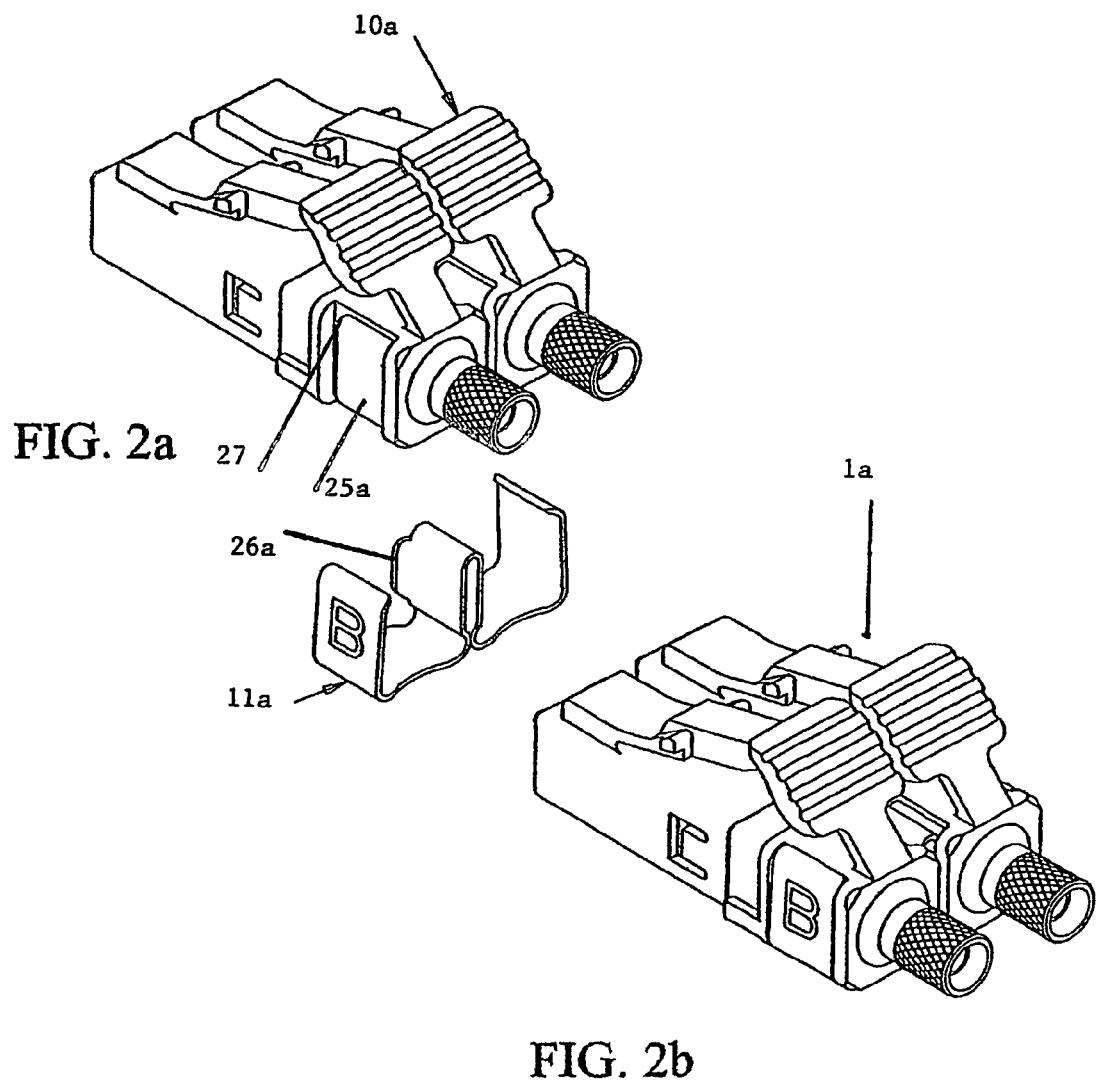
FIGS. 2a and 2b are perspective views of a preferred embodiment of the present invention using a metallic clip in a preassembled and assembled state, respectively.
Figure 3:
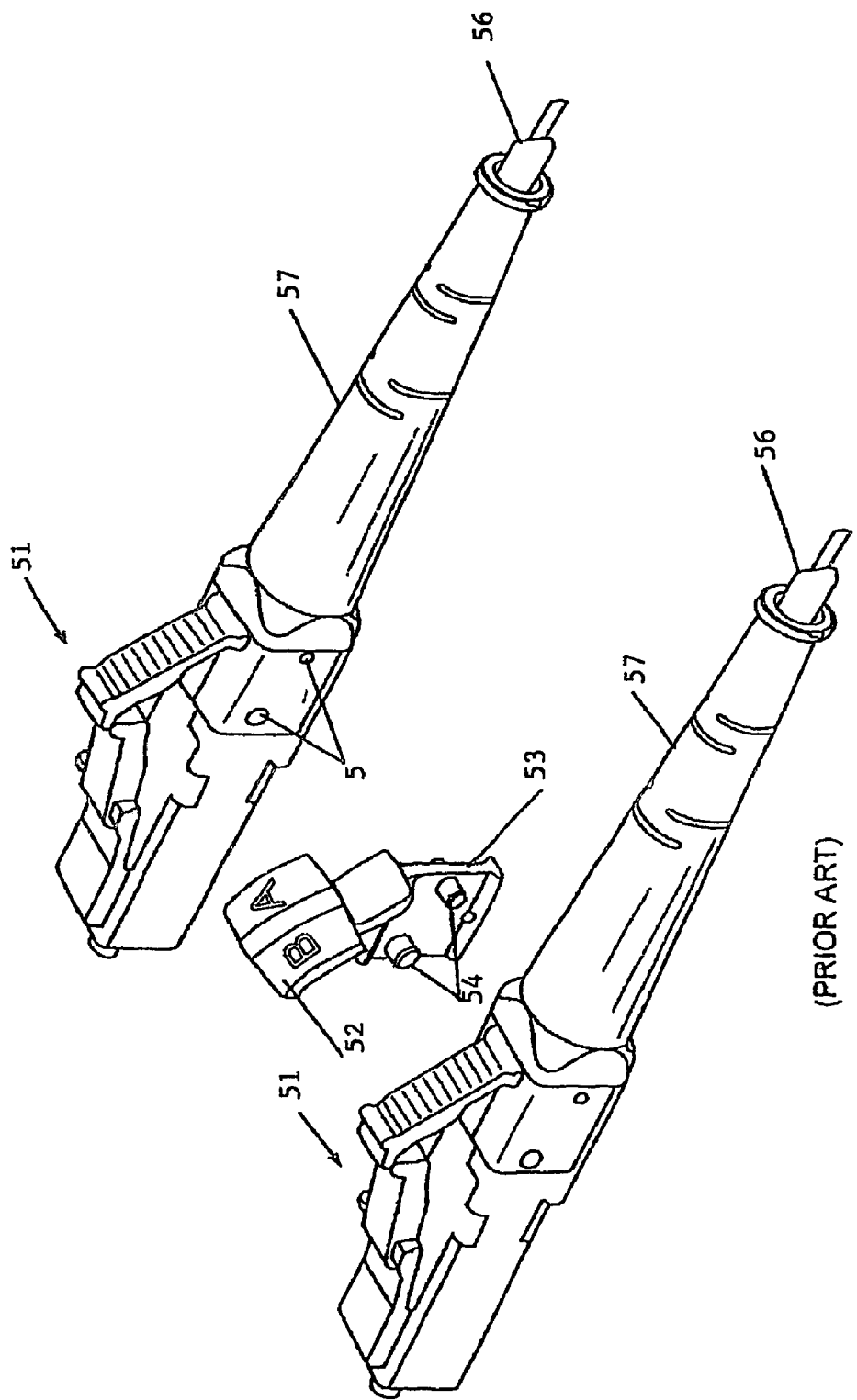
FIG. 3 is a perspective view of a prior art duplex connector being clipped together via a duplex clip to form a duplex connector.
Figure 4:
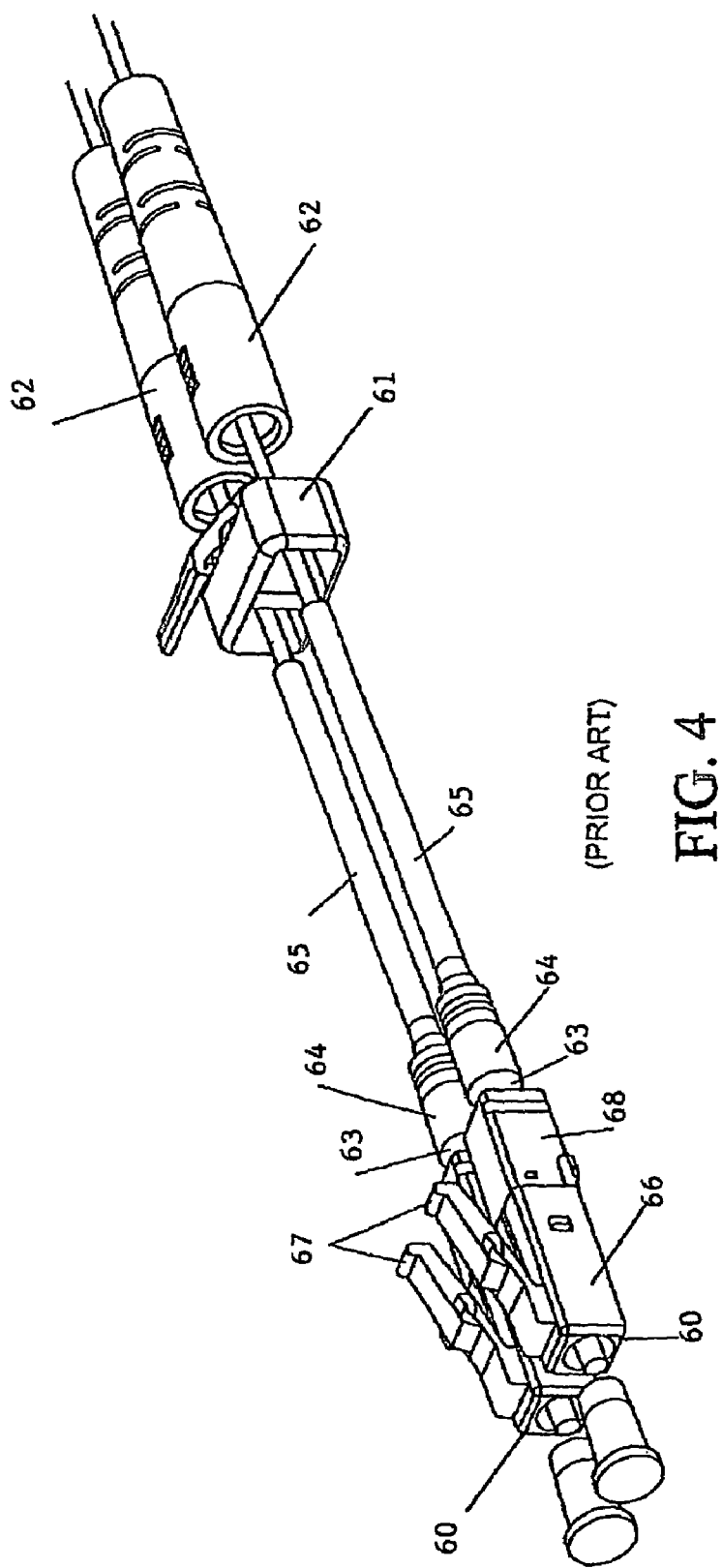
FIG. 4 is a perspective view of a prior art duplex connector being clipped together via a duplex yoke to form a duplex connector.

The connector 10 comprises a generally-rectangular housing 28 having a front body 12 and a rear body 13. As with a typical LC connector, the embodiment of the connector in FIG. 1 comprises a latch 15, an anti-snag guard 16 covering the end of the latch 15, and a crimped lug 14 for securing the connector to an optical cable on rear body 13. Like standard simplex LC connectors, connector 10 also has an individual actuation pad 10a (see FIG. 2). The connector of the present invention departs from a standard LC connector, however, in that it has a recess 25 near its cable end for receiving the clip 11. Preferably, the recess 25 is located behind the portion of the connector which is received in the receptacle and forward of the crimp lug 14. In this particular embodiment, the recess is located below the anti-snag guard 16. With this configuration, the anti-snag guard 16 and the recess features 25 can be integrated on a common rear body 13. The recess can be any configuration suitable for receiving a clip which contacts both sides of the connector to hold it securely. In the embodiment shown in FIG. 1, the recess is a continuous recess which extends from one side of the connector 31a down around the bottom 30 of the connector and up the other side 31b. It may be preferable to add certain polarization maintaining features to the recess to ensure that it can receive the clip only in a certain orientation. For example, referring to FIG. 2a, the polarization-maintaining features of the recess may be an asymmetrical geometry, specifically, a recess 25 with a deeper portion 27, which is designed to received a rib 26a on the clip (discussed in detail below) only when the clip 11a is in a certain orientation relative to the connector 1a.

It is worthwhile to mention that the connectors 10 are not specifically designed for a duplex assembly. That is, the connectors 10 are designed as stand-alone simplex connectors which can be used as building blocks to form assemblies of any number of connectors, such as a duplex or quad assemblies, using the clip of the present invention.

Referring to FIG. 1, the clip 11 of the present invention is shown. As mentioned above, the clip has a bottom portion 19, first and second end walls 20a, 20b extending perpendicularly from the bottom portion 19, and an intermediate portion 21 extending perpendicularly from the bottom portion 19 between the first and second end walls 20a, 20b. Although the clip is described as having a "bottom" section, it should be understood that this is a relative term used for illustrative purposes and should not be construed to limit the scope of the intention. In other words, it is well within the scope of this invention for the clip to be inverted such that the bottom faces upward. The intermediate portion 19 has a first face 34a facing the first end wall 20a and a second face 34b facing the second end wall 20b. The number of intermediate portions determines the number of connectors the clip can accommodate (i.e., no. of connectors=no. of intermediates portions +1). For example, in the embodiment shown in FIG. 1, the clip has a single intermediate portion, and, thus, it can accommodate two connectors.

In the case of a duplex assembly, each connector will be held by one face of the intermediate position and one end wall of the clip. If more than two connectors are held together in a side-by-side arrangement, then the interior-held connectors are held in place by the intermediate portions of the clip and do not contact the end walls. It should also be appreciated that the clip may contain a second set of end walls and intermediate portions which extend from the other side of the bottom portion of the clip. Having end walls and intermediate portions extending from both sides of the bottom portion allows connectors to be connected on either side of the clip. The connectors in such an assembly are arranged side-by-side and bottom-to-bottom. Such a configuration may be preferred, for example, in quad connector assemblies in which two side-by-side connectors are located on one side of the bottom portion and two side-by-side connectors are located on the other side of the bottom portion.

In a preferred embodiment, the clip comprises certain polarization-maintaining features which ensure polarization among the connectors. For example, in the embodiments shown in FIG. 1 and FIG. 2a, the polarization maintaining feature is a rib 26, 26a, respectively, along the portion of the clip which interfaces with the deeper portion 27 of the recess 25a of the connector (shown in FIG. 2a). This rib ensures that clip can only be secured to the connectors in a particular orientation. In other words, one cannot orient the clips shown in FIGS. 1 and 2 by 180° and expect to the rib to be received in the deeper portion of the recesses of the connectors as shown. If the clip is provided with polarization-maintaining features as described above, it is preferable for the clip to comprise indicia indicating this polarization. For example, in the embodiments shown in FIGS. 1 and 2a, the clips 11, 11a has the indicia "A" on one side and "B" on the other, in accordance with industry practice.

The clip may comprise any resilient material to enable it to be resiliently deflected to separate the intermediate portion and an end wall sufficiently such that they can be slipped over the connector, and then be released to its initial position, thereby snugly gripping the connectors. Suitable materials include, for example, plastics and metals. In a preferred embodiment, the clip comprises a plastic molded in accordance with the embodiment shown in FIG. 11. A plastic clip allows the intermediate portion and the polarization maintaining features to be integrally molded with the bottom portion and the sides as shown. Additionally, applicants have found that the use of a plastic clip minimizes EMI issues with respect to the connector assembly. It is suspected that a metal clip, if not properly grounded, may, under certain circumstances, act as an antenna and become a source of electromagnetic interference (EM). Although plastic may be preferred, the reason stated above, a metal clip 11a may be preferred nevertheless from the standpoint of manufacturability as shown in FIG. 2a. That is, techniques for stamping and forming metal strips are well known in the art, and a single metal strip can be readily formed to have the end walls and intermediate portions as discussed above. Furthermore, the metal clip 11a may offer advantages over a plastic clip in that a metal clip may be much thinner than a plastic clip of similar strength.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. An optical connector assembly comprising:
   a plurality of identical simplex connectors, each connector comprising at least a housing having a top, a bottom and two sides, and having a plug end for insertion into a mating receptacle and a cable end for receiving an optical cable, said housing having a recess along each of the two sides; and
   a clip holding said plurality of connectors together in a side-by-side relationship, said clip having a bottom portion, first and second end walls extending upward from said bottom portion, and one or more intermediate portions extending upward from said bottom portion between said first and second end walls, each of said one or more intermediate portions having a first end face facing said first end wall and a second face facing second end wall;

wherein said first end wall and a first face of one of said one or more intermediate portions are received in the recess of one of said connectors and said second end wall and a second face of one of said one or more intermediate walls are received in the recess of another of said connectors such that said connectors are held in a side-by-side arrangement;

wherein said recess of each connector is deep enough to receive said clip such that said clip does not extend beyond the periphery of said housing; and wherein said recess has a deep portion and said clip has a rib asymmetrically located thereon such that and said rib is received in said deep portion to hold said connectors in a side-by-side arrangement in a certain orientation.

2. The connector assembly of claim 1, wherein each connector has a latch connected to said housing.

3. The connector assembly of claim 2, wherein said recess is below said latch.

4. The connector assembly of claim 3, wherein said recess extends from one side of the connector down around the bottom of the connector and up the other side.

5. The connector assembly of claim 2, wherein said cable end comprises a crimp lug adapted for securing a cable to said connector.

6. The connector assembly of claim 5, wherein said recess is in front of said crimp lug.

7. The connector assembly of claim 1, wherein a plurality of connector is two connectors.

8. The connector assembly of claim 1, wherein said connectors are small form factor connectors.

9. The connector assembly of claim 1, wherein said clip comprises a resilient material enabling it to be snapped onto each connector.

10. The connector assembly of claim 9, wherein said clip comprises metal.

11. The connector assembly of claim 10, wherein said clip is a single piece of metal bent to form each said end walls and said intermediate portions.

12. The connector assembly of claim 9, wherein said clip comprises plastic.

13. The connector assembly of claim 1, wherein said clip comprises one intermediate portion.

14. The connector assembly of claim 1, wherein said each connector is connected to an optical cable.

15. The connector assembly of claim 14, wherein said optical cable is jacketed.

16. The optical connector assembly of claim 1, wherein said clip is marked to indicate the orientation of said rib.

17. The optical connector assembly of claim 16, wherein said first side wall is marked with an "A" and said second side wall is marked with a "B."

18. The optical connector assembly of claim 1, wherein said first and second walls and said one or more intermediate portions are thicker at the bottom than at the top, and said recess is deeper at the bottom to receive said first and second side walls and said intermediate portions such that said clip does not extend beyond the periphery of said housing.

19. The optical connector assembly of claim 18, wherein first and second side walls have an outer face and an inner face, said outer face extending perpendicularly from said bottom portion and said inner face extending at an angle such that said first and second side walls are thicker at the bottom than at the top.

20. The optical connector assembly of claim 1, wherein said connector is an LC-type connector.

21. The optical connector assembly of claim 1, wherein said connector comprises a generally rectangular housing and said first and second end walls and intermediate portions extend substantially perpendicularly from said bottom portion.

22. The optical connector assembly of claim 1, wherein said connector also comprises an individual actuation pad for acquitting said latch.

23. The optical connector assembly of claim 22, wherein said actuation pad is integral to a latch snag guard which is attached to the connector housing.

* * * * *